United States Patent [19]

Krebs

[11] Patent Number: 5,255,209

[45] Date of Patent: Oct. 19, 1993

[54] METHOD FOR DETERMINING THE COMBUSTION CHAMBER PRESSURE IN A CYLINDER OF AN INTERNAL-COMBUSTION ENGINE WITH A PRESSURE SENSOR

[75] Inventor: Stefan Krebs, Regensburg, Fed. Rep. of Germany

[73] Assignee: Siemens Aktiengesellschaft, Munich, Fed. Rep. of Germany

[21] Appl. No.: 746,153

[22] Filed: Aug. 14, 1991

Related U.S. Application Data

[63] Continuation of Ser. No. 527,291, May 22, 1990, abandoned.

[30] Foreign Application Priority Data

May 23, 1989 [EP] European Pat. Off. ............ 89109255

[51] Int. Cl.$^5$ ............................................. G01M 15/00
[52] U.S. Cl. ................................ 364/558; 364/571.02; 364/431.03
[58] Field of Search ............... 364/558, 431.03, 571.01, 364/571.02, 571.05, 575, 431.04, 431.05; 73/115, 117.3; 123/425, 435

[56] References Cited

U.S. PATENT DOCUMENTS

| | | | |
|---|---|---|---|
| 4,122,706 | 10/1978 | Schmidt | 73/115 |
| 4,633,707 | 1/1987 | Maddox | 73/115 |
| 4,800,500 | 1/1989 | Tanaka | 364/431.04 |
| 4,892,075 | 1/1990 | Iriyama et al. | 73/115 |
| 4,920,494 | 4/1990 | Abo et al. | 123/425 |

FOREIGN PATENT DOCUMENTS

3036355A1 4/1981 Fed. Rep. of Germany.
3632221A1 4/1987 Fed. Rep. of Germany.
2187001A 8/1987 United Kingdom.

*Primary Examiner*—Thomas G. Black
*Assistant Examiner*—Michael Zanelli
*Attorney, Agent, or Firm*—Hill, Steadman & Simpson

[57] ABSTRACT

Atmospheric pressure is allocated to a sensor signal of a pressure sensor as a reference pressure for a piston position in the load change upper dead center position. The sensor sensitivity and, on the basis thereof, the absolute pressure value at arbitrary piston positions is determined from this reference signal and two further sensor signals at prescribed piston positions.

20 Claims, 2 Drawing Sheets

METHOD FOR DETERMINING THE COMBUSTION CHAMBER PRESSURE IN A CYLINDER OF AN INTERNAL-COMBUSTION ENGINE WITH A PRESSURE SENSOR

This is a continuation, of application Ser. No. 527.291, filed May 22, 1990 now abandoned.

BACKGROUND OF THE INVENTION

The present invention is directed to a method for determining the absolute pressure in the combustion chamber of an internal combustion engine with a pressure sensor.

The characteristic of a pressure sensor (the physical relationship between measured pressure and the sensor output signal) is kept within narrow tolerances for laboratory use by means of complex designs and/or calibration. The evaluation of the sensor signals occurs either with the characteristic defined by the manufacture or, for higher precision measurements, an additional calibration of the sensor is carried out immediately before a use.

In internal-combustion engines of motor vehicles, the absolute pressure in the combustion chamber is used e.g. for diagnostic and/or control of the combustion, for controlling knocking, for determining the work performed, etc.

In the automotive field, there is a need for inexpensive and reliable pressure sensors. Factors such as manufacturing tolerances, sensor aging, signal drift and temperature-dependency of the sensor make it difficult to produce an inexpensive and reliable pressure sensor as is needed in this automotive field. According to German published application 37 04 837, the maximum combustion pressure is calculated in a combustion-free condition (for example, deceleration) that extends over a plurality of work cycles and this is compared to a stored reference value. The maximum combustion chamber pressure identified during normal combustion is corrected using the difference or the ratio between these two values. A disadvantage of this method is that the correction value is identified in a first operating mode and is subsequently applied to signals that are determined in a different operating mode wherein entirely different combustion chamber conditions are present. Significant mismeasurements can arise as a result thereof.

SUMMARY OF THE INVENTION

An object of the present invention is to increase the precision of measuring the absolute pressure in the combustion chamber of a cylinder in an internal-combustion engine, especially during normal combustion.

This object is inventively achieved by a method having the steps of: obtaining a reference electrical signal, from said sensor during a cycle of the internal-combustion engine when the pressure in said cylinder chamber is at a known absolute reference pressure value, for a reference piston position of the piston in the cylinder; obtaining first and second electrical signals, from said sensor during the same cycle representative of pressure in said cylinder chamber for two different first and second piston positions of said piston in said cylinder; determining a sensitivity, of the sensor from the absolute reference pressure value, the reference electrical signal the first and second electrical signals, and a constant; defining a characteristic curve of the sensor using the reference electrical signal, and the sensitivity; obtaining a further electrical signal, from the sensor representative of pressure in the cylinder chamber for a further arbitrary piston position of the piston in said cylinder; identifying a further pressure, corresponding to the further electrical signal, using the characteristic curve. The method of the present invention utilizes the fact that the relationship of the pressure values in the combustion chamber for two different piston positions is dependent upon the relationship of the volume of the combustion chamber limited by such piston. The present invention enables the pressure sensor to be calibrated immediately before every combustion.

The knowledge of an absolute reference pressure is required in the method. For example, the atmospheric pressure or a parameter that is already measured and that is dependent on the atmospheric pressure in a known way preferably serves as the absolute reference pressure. This is based on the perception that the pressure in the combustion chamber at the upper dead center piston position has a reference value which practically corresponds to the atmospheric pressure when the intake and the discharge valves are simultaneously open and for a brief duration at a standstill of the piston. This happens at one of the two upper dead center positions, OTL, in every cycle (every two turns of the crank shaft) and is approximately valid for all load conditions of the engine. The other, upper dead center position, OTV, marks the beginning of the second phase of each cycle including combustion. The sensitivity (slope of the characteristic) of the employed pressure sensor is first calculated based on the polytropic pressure change between two further defined positions of the piston. Finally, the absolute pressure at an arbitrary position of the piston is calculated based on the reference pressure and the sensitivity. The measuring precision is enhanced when the sensor signal allocated to each piston position is a function of a prescribed plurality of measured values, for example, the value could be the average or sliding average of several values in a defined region preceding or following the respective piston position or the average of a prescribed plurality of values acquired in successive work cycles.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing in which:

DESCRIPTION OF THE PREFERRED EMBODIMENT

Figure 1:
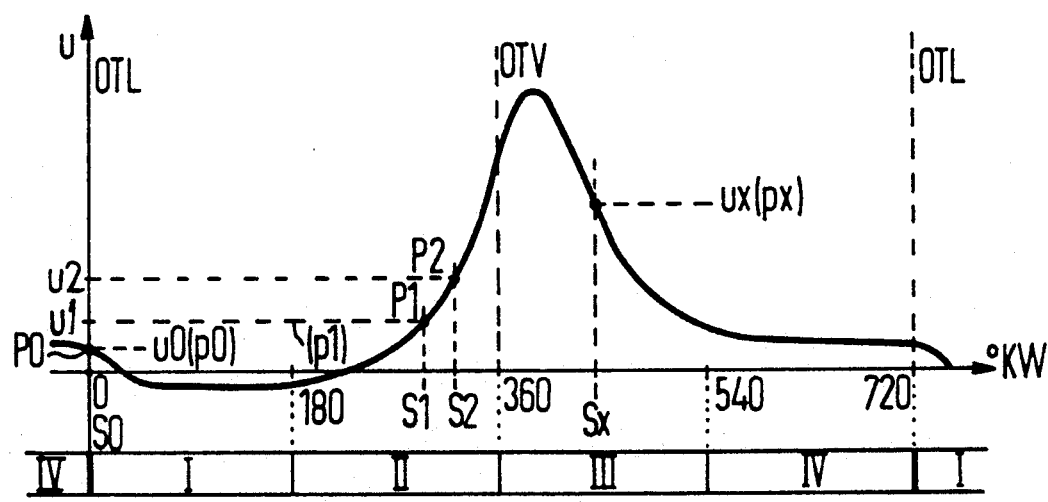
FIG. 1 is a graph of a sensor signal U of a pressure sensor dependent on the positions of the piston/crank shaft, KW, for an entire work cycle.

FIG. 1 shows a curve of the sensor signal U of a pressure sensor that communicates with the combustion chamber of an internal-combustion engine. The crank shaft angle from 0° through 720° KW (corresponding to two full revolutions of the crank shaft) is shown on the abscissa. The value of 0° and 720° thereby correspond to the piston positions S0 in the upper dead center OTL between the exhaust expulsion phase IV and the intake phase I of the work cycle, where both the discharge valve as well as the intake valve of the cylinder are opened and where the pressure in the cylinder chamber roughly corresponds to the atmospheric pressure P0.

The value 360° KW corresponds to the piston position in the upper dead center OTV between the compression phase II and the combustion phase III of the work cycle.

Three sensor signals u0, u1 and u2 corresponding to the combustion chamber pressures p0, p1 and p2 at three prescribed piston positions S0, S1 and S2 are required for calibration of the pressure sensor.

The upper dead center OTL corresponding to 0° KW is defined as a reference position S0, where the measured sensor signal u0 represents the absolute atmospheric pressure p0.

In this embodiment, the first piston position S1 is at 290° KW and the second piston position S2 is at 310° KW in the compression phase II of the work cycle. The pressure signals u1 and u2 corresponding to the pressure values p1 and p2 are measured at the two piston positions S1 and S2.

The polytropic change of p1 to p2 is:

$$\frac{p2}{p1} = \left(\frac{V1}{V2}\right)^n \quad (1)$$

with V1 and V2 being the volumes of the combustion chamber with the piston in positions S1 and S2, respectively, and n being the polytropic exponent. During the compression phase, n is roughly constant and has the value n=1.35.

Equation (1) transformed yields:

$$\frac{p2 - p1}{p1} = \left(\frac{V1}{V2}\right)^n - 1 \quad (2)$$

Figure 2:
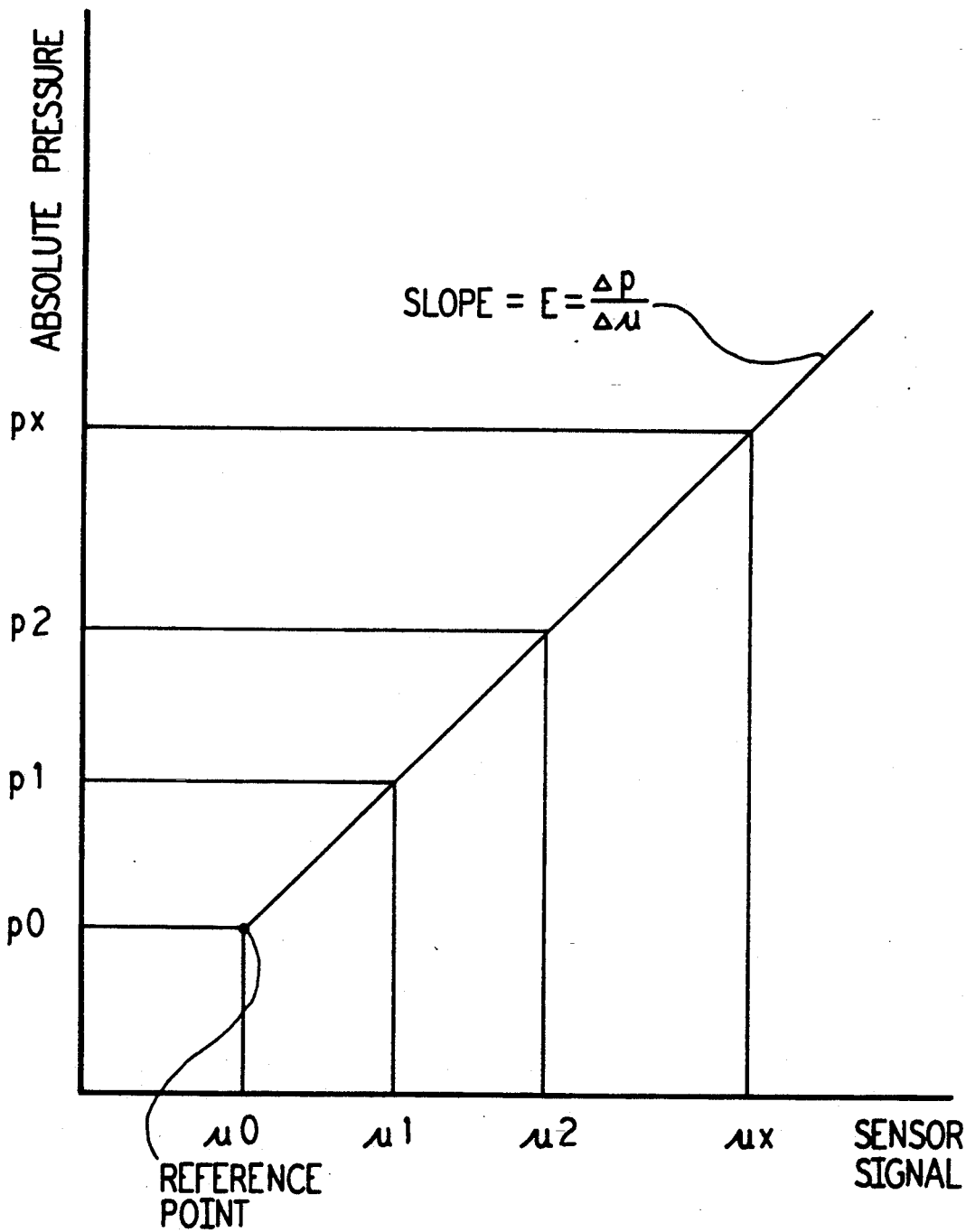
FIG. 2 shows the characteristic of a pressure sensor, e.g. the sensor signal U dependent on the pressure P.

From FIG. 2 it can be seen that the sensor sensitivity E for a linear pressure sensor is:

$$E = \frac{\Delta p}{\Delta u} = \frac{p2 - p1}{u2 - u1} \quad (3)$$

Combining equations (2) and (3) yields:

$$\frac{E(u2 - u1)}{p1} = \left(\frac{V1}{V2}\right)^n - 1 \quad (4)$$

The absolute pressure p1 derives from the reference pressure p0 and sensitivity E according to FIG. 1:

$$p1 = p0 + E(u1 - u0) \quad (5)$$

Combining equations 4 and 5 yields the sensitivity E as follows:

$$E = p0 \left[ \frac{1}{\frac{u2 - u1}{\left(\frac{V1}{V2}\right)^n - 1} - u1 + u0} \right] \quad (6)$$

$$E = p0 \left[ \frac{1}{\left(\frac{u2 - u1}{K}\right) - u1 + u0} \right]$$

$$\text{with } K = \left(\frac{V1}{V2}\right)^n - 1 \quad (7)$$

With these values of p0 and E, the pressure pX at an arbitrary piston position Sx is calculated as follows:

$$px = p0 + E(ux - u0) \quad (8)$$

The sensor sensitivity E in every work cycle can be easily calculated from equation (6). Inserting the sensor sensitivity E, the reference pressure p0 and the actual sensor signal ux into equation (8) yields the desired pressure value px with good precision.

Since the polytropic exponent n is dependent on the operating condition, that is, is dependent on the motor speed and on the motor load, the value K of equation (7) is preferably stored in a characteristic field that is dependent on each operating condition and then taken from this character field at every calculation of the sensor sensitivity E corresponding to equation (8).

The measuring precision can be further enhanced when it is not individual values of the sensor signals u0, u1 and u2 but averages of a prescribed plurality of values in a defined region, for example 5° preceding and 5° following the respective, prescribed piston position S0, S1 and S2 or values from a sliding averaging over a prescribed number of work cycles that are used for the calculation.

The value of the sensitivity E can also be computed by sliding averaging since, if it changes at all, it only changes slowly for an intact pressure sensor.

The sensitivity E and the rate of change thereof can be utilized for monitoring the function of the pressure sensor, (for example, for shorts, interruption and slow loss of sensitivity), whereby an error signal is triggered when the identified sensitivity E or the change thereof in a defined time lies outside of the prescribed values.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for measuring pressure in a cylinder chamber of an internal-combustion engine using a sensor that is in communication with the cylinder chamber, the sensor generating an electrical signal representative of sensed pressure in the cylinder chamber, the cylinder chamber defined by a cylinder containing a piston in the internal-combustion engine, during operation of the internal-combustion engine having a plurality of work cycles, each work cycle for each cylinder chamber being composed of a first cycle for intake, a second cycle for compression, a third cycle for combustion and a fourth cycle for exhaust, comprising the steps of:

outputting a reference electrical signal, u0, from said sensor during each work cycle of the internal-combustion engine when the pressure in said cylinder chamber is at a known absolute reference pressure value, p0, for a reference piston position of the piston in the cylinder;

outputting first and second electrical signals, u1 and u2, from said sensor during the same cycle representative of pressure in said cylinder chamber for two different first and second piston positions of said piston in said cylinder;

determining a sensitivity, E, of the sensor from the absolute reference pressure value, p0, the reference electrical signal u0, the first and second electrical signals, u1 and u2, and a constant, K;

defining a characteristic curve of the sensor using the reference electrical signal, u0, and the sensitivity, E;

outputting a further electrical signal, ux, from the sensor representative of pressure in the cylinder chamber for an arbitrary piston position of the piston in said cylinder;

deriving a further pressure value, px, from the further electrical signal, ux, using the characteristic curve; and using the further pressure value, px, as a value representing an actual pressure value in said cylinder chamber for said arbitrary piston position.

2. The method according to claim 1, wherein the reference pressure value is a function of the atmospheric pressure.

3. The method according to claim 1, wherein the reference piston position corresponds to an upper dead center position of the cylinder at a load change.

4. The method according to claim 1, wherein the first piston position and second piston position lie in a range of approximately 70° to 40° KW preceding an upper dead center position of the cylinder at combustion.

5. The method according to claim 1, wherein the first piston position and second piston position lie at a distance of approximately 20° KW from one another.

6. The method according to claim 1, wherein at least one of the reference, first, and second electrical signals respectively allocated to the reference, first, and second piston positions is determined by averaging a plurality of values of the one of the reference, first, and second electrical signals acquired in a defined range preceding and following the respective reference, first, and second piston positions.

7. The method according to claim 1, wherein at least one of the reference, first, and second electrical signals respectively allocated to the reference, first, and second piston positions is determined by sliding averaging of a plurality of the one of the reference, first, and second electrical signals acquired in successive work cycles of the internal-combustion engine.

8. The method according to claim 1, wherein a value of the sensitivity of the pressure sensor is determined by sliding averaging of a plurality of stored values of the sensitivity calculated in successive work cycles of the internal-combustion engine.

9. The method according to claim 1, wherein the constant is stored in a characteristics field as a function of a crank shaft angle of the internal-combustion motor and an operating point of the internal-combustion engine.

10. The method according to claim 9, wherein the constant is derived from the equation:

$$K = \left(\frac{V1}{V2}\right)^n - 1$$

where
V1 is equal to a combustion chamber volume of the cylinder at the first piston position,
V2 is equal to a combustion chamber volume of the cylinder at the second piston position, and
n is a polytropic exponent.

11. The method according to claim 10, wherein the polytropic exponent allocated to the internal-combustion engine is stored in a characteristics field as a function of an operating point of the internal-combustion engine.

12. The method according to claim 1, wherein an error signal is triggered when the value of the sensitivity lies outside of a prescribed value range.

13. The method according to claim 1, wherein values of the sensitivity are stored over a number of work cycles of the internal-combustion engine and wherein an error signal is triggered when a chronological change in the stored value of the sensitivity lies outside of a prescribed value range.

14. The method according to claim 1, wherein the sensitivity, E, of the sensor is determined according to:

$$E = p0 \left[ \frac{1}{\left(\frac{u2 - u1}{K}\right) - u1 + u0} \right]$$

15. The method according to claim 1, wherein the further pressure value, px, is derived from the characteristic curve according to:

$$px = p0 + E(ux - u0).$$

16. A method for measuring pressure in a cylinder chamber of an internal-combustion engine using a sensor that is in communication with the cylinder chamber, the sensor generating an electrical signal representative of sensed pressure in the cylinder chamber, the cylinder chamber defined by a cylinder containing a piston in the internal-combustion engine, during operation of the internal-combustion engine having a plurality of work cycles, each work cycle for each cylinder chamber being composed of a first cycle for intake, a second cycle for compression, a third cycle for combustion and a fourth cycle for exhaust, comprising the steps of:

outputting a reference electrical signal, u0, from said sensor during each work cycle of the internal-combustion engine when the pressure in said cylinder chamber is at a known absolute reference pressure value, p0, for a reference piston position of the piston in the cylinder, the reference piston position being an upper dead center position of the piston in the cylinder;

outputting first and second electrical signals, u1 and u2, from said sensor during the second cycle representative of pressure in said cylinder chamber for two different first and second piston positions of said piston in said cylinder;

determining a sensitivity, E, of the sensor from the absolute reference pressure value, p0, the reference electrical signal u0, the first and second electrical signals, u1 and u2, and a constant, K;

defining a characteristic curve of the sensor using the reference electrical signal, u0, and the sensitivity, E;

outputting a further electrical signal, ux, from the sensor representative of pressure in the cylinder chamber for an arbitrary piston position of the piston in said cylinder during at least the third cycle;

deriving a further pressure value, px, from the further electrical signal, ux, using the characteristic curve;

using the further pressure value, px, as a value representing an actual pressure value in said cylinder chamber for said arbitrary piston position;

wherein the sensitivity, E, of the sensor is determined according to $$E = p0 \left[ \frac{1}{\left(\frac{u2 - u1}{K}\right) - u1 + u0} \right]$$

and wherein the further pressure value, px, is identified from the characteristic curve according to $$px = p0 + E(ux - u0)$$

and wherein the constant, K, is derived from $$K = \left(\frac{V1}{V2}\right)^n - 1$$

where
V1 is equal to a combustion chamber volume of the cylinder at the first piston position,
V2 is equal to a combustion chamber volume of the cylinder at the second piston position, and
n is a polytropic constant.

17. The method according to claim 16, wherein the reference pressure is a function of the atmospheric pressure, wherein the reference piston position corresponds to an upper dead center position of the cylinder at a load change, and wherein the first piston position and second piston positions lie in a range of approximately 70° to 40° KW preceding an upper dead center position of the cylinder at combustion.

18. The method according to claim 16, wherein the first piston position and second piston position lie at a distance of approximately 20° KW from one another.

19. The method according to claim 16, wherein the constant is stored in a characteristics field as a function of a crank shaft angle of the internal-combustion motor and an operating point of the internal-combustion engine.

20. The method according to claim 16, wherein an error signal is triggered when the value of the sensitivity lies outside of a prescribed value range.

* * * * *